(12) United States Patent
Chang

(10) Patent No.: US 8,205,303 B2
(45) Date of Patent: Jun. 26, 2012

(54) HINGE

(75) Inventor: Jung-Bin Chang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 183 days.

(21) Appl. No.: 12/766,836

(22) Filed: Apr. 23, 2010

(65) Prior Publication Data

US 2011/0232037 A1 Sep. 29, 2011

(30) Foreign Application Priority Data

Mar. 23, 2010 (TW) ................................ 99205074 U

(51) Int. Cl.
*E05C 17/64* (2006.01)
(52) U.S. Cl. ................................ 16/342; 16/340; 16/374
(58) Field of Classification Search .................... 16/342, 16/303, 330, 334, 340, 297, 374, 387, 321, 16/337; 455/575.3; 379/433.13; 361/679.27
See application file for complete search history.

(56) References Cited

U.S. PATENT DOCUMENTS

| | | | | |
|---|---|---|---|---|
| 6,813,813 B2 * | 11/2004 | Lu et al. | ........................... | 16/342 |
| 6,862,779 B1 * | 3/2005 | Lu et al. | ........................... | 16/340 |
| 7,082,643 B2 * | 8/2006 | Lu et al. | ........................... | 16/340 |
| 7,222,396 B2 * | 5/2007 | Lu et al. | ........................... | 16/340 |
| 7,275,286 B2 * | 10/2007 | Lu et al. | ........................... | 16/340 |
| 7,506,408 B2 * | 3/2009 | Lu et al. | ........................... | 16/340 |
| 7,870,644 B2 * | 1/2011 | Chang | ........................... | 16/337 |
| 2007/0180656 A1 * | 8/2007 | Chen et al. | ........................... | 16/340 |
| 2009/0172916 A1 * | 7/2009 | Chern | ........................... | 16/342 |
| 2010/0000049 A1 * | 1/2010 | Lin | ........................... | 16/340 |
| 2011/0016669 A1 * | 1/2011 | Shen | ........................... | 16/342 |
| 2011/0041289 A1 * | 2/2011 | Shen | ........................... | 16/342 |
| 2011/0056048 A1 * | 3/2011 | Shen | ........................... | 16/342 |

* cited by examiner

*Primary Examiner* — William L. Miller
(74) *Attorney, Agent, or Firm* — Altis Law Group, Inc.

(57) ABSTRACT

A hinge includes a fixing member, a shaft fixed to the fixing member, a rotating member, an interfering member, and a fastener. The shaft includes a shaft post, and the fastener is fixed to a distal end of the shaft post. The interfering member defines a fixing hole departing from a center of the interfering member, and includes two guiding surfaces. The rotating member defines an oblong adjusting hole, through which the shaft post rotatably passes. A first resisting stub and a second resisting stub extend from the rotating member, to resist against the corresponding guiding surfaces. The shaft post is fixedly received in the fixing hole. When the rotating member is rotated relative to the shaft post, the first and second resisting stubs always resist against and move along the corresponding guiding surfaces, to urge the shaft post to relatively move in the adjusting hole.

12 Claims, 6 Drawing Sheets

HINGE

BACKGROUND

1. Technical Field

The disclosure relates to a hinge.

2. Description of Related Art

A collapsible device, such as a notebook computer or a clamshell mobile phone, generally includes a base, a cover, and a hinge interconnecting the base and the cover. The hinge allows the cover to be rotatable with respect to the base, and to be folded with the base for saving space.

The hinge normally includes a first element and a second element fixed to the base and the cover of the collapsible device, respectively. The first and second elements are rotatable relative to and in friction engagement with each other for maintaining the cover at a desired angle with respect to the base. However, if the base or the cover is thick, a proximal edge of the cover is apt to hit the base during pivot of the cover, which causes inconvenience.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
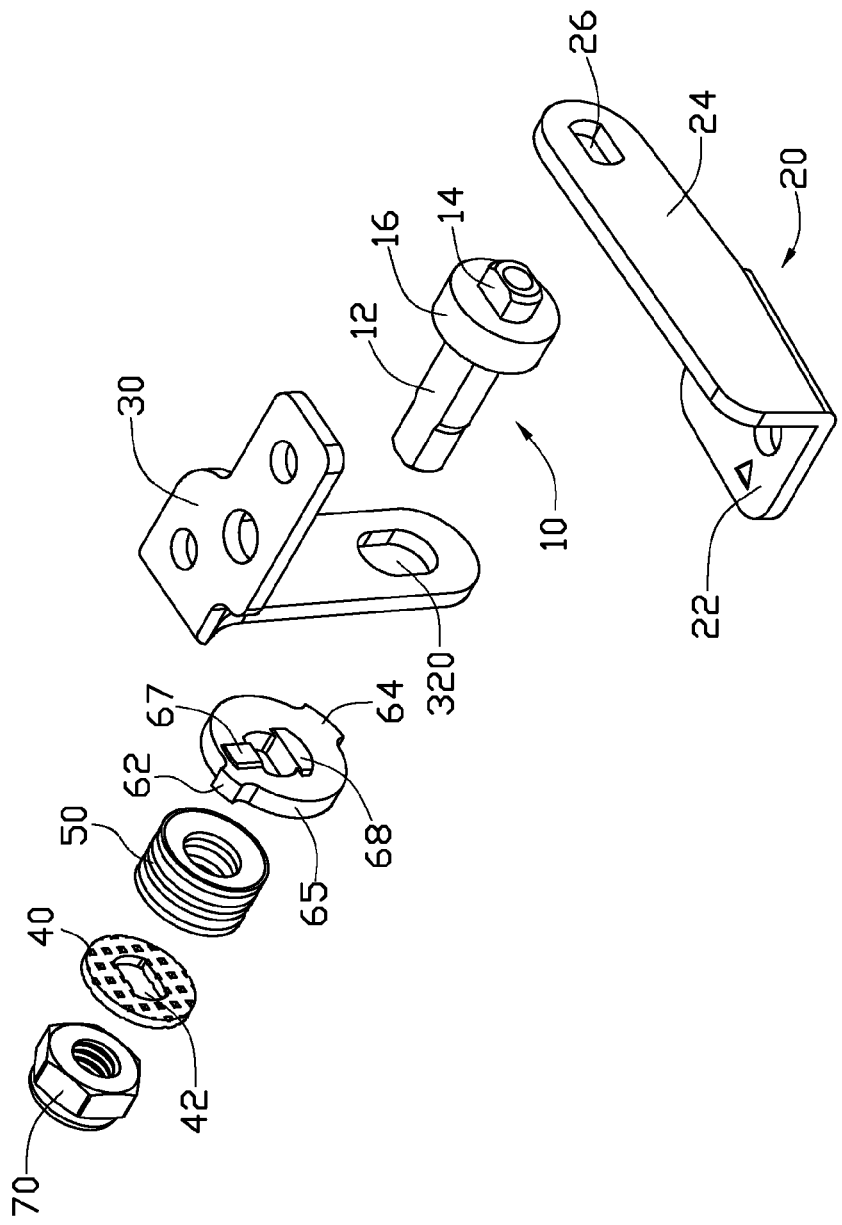
FIG. 1 is an exploded, isometric view of an exemplary embodiment of a hinge.
Figure 2:
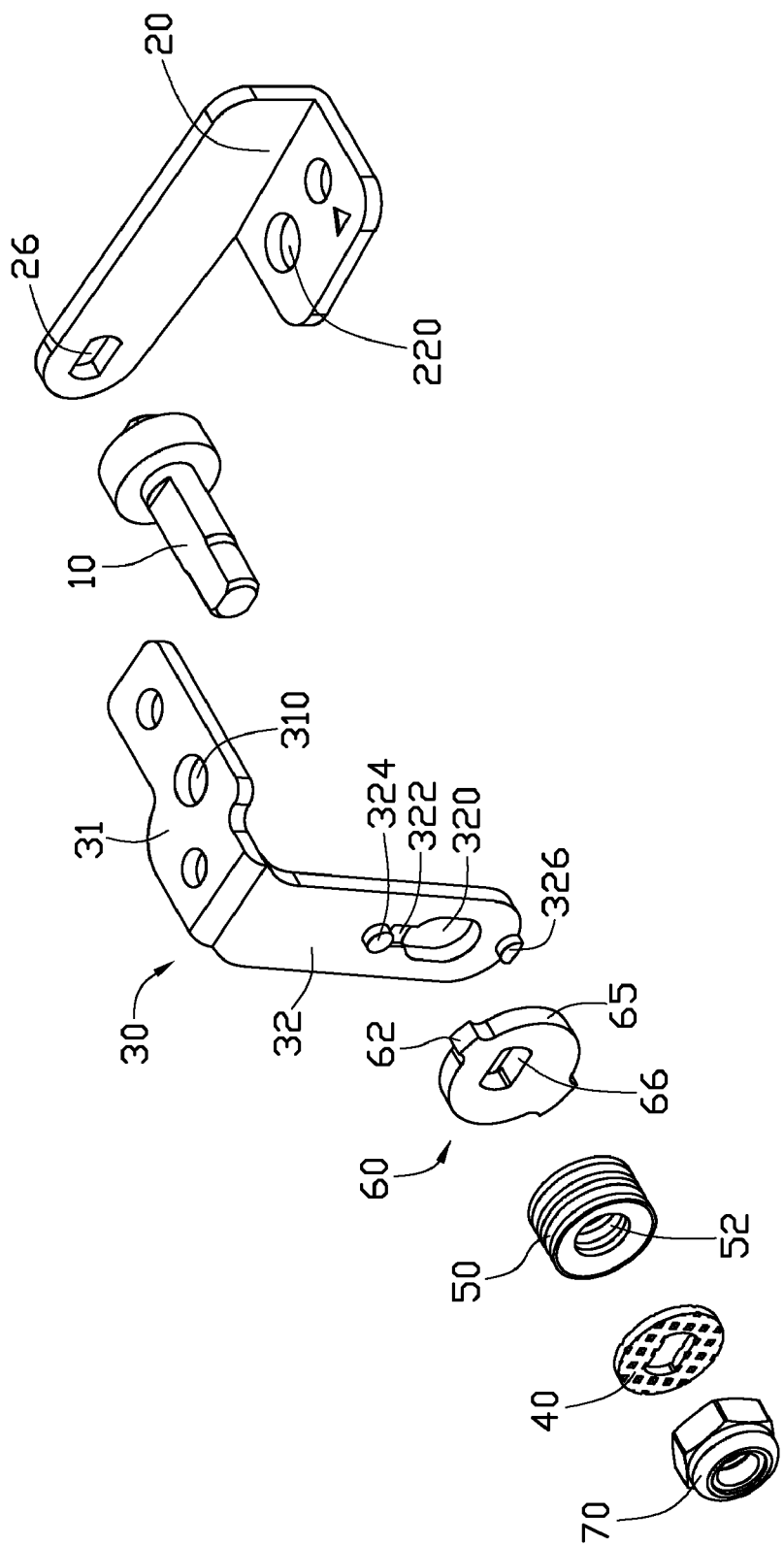
FIG. 2 is similar to FIG. 1, but viewed from another perspective.

Referring to FIGS. 1 and 2, an exemplary embodiment of a hinge includes a shaft 10, a fixing member 20, a rotating members 30, a washer 40, an elastic assembly 50, an interfering member 60, and a fastener 70. In this embodiment, the fastener 70 is a nut.

The shaft 10 includes a fixing portion 14, a shaft post 12 opposite to the fixing portion 14, and a washer-shaped resisting portion 16 between the fixing portion 14 and the shaft post 12. The shaft post 12 has a double D-shaped cross-section, thereby, the shaft post 12 includes two opposite flat surfaces (not labeled). The resisting portion 16 has a greater diameter than the shaft post 12.

The fixing member 20 includes a connecting portion 22 defining a plurality of fixing holes 220 therein, and a fixing portion 24 perpendicularly extending from a side of the connecting portion 22. The fixing portion 24 defines a matching hole 26 having a double-D shaped cross-section, corresponding to the fixing portion 14 of the shaft 10, for non-rotatably fixing the shaft 10 to the fixing member 20.

The rotating member 30 is generally L-shaped. The rotating member 30 includes a fixing arm 31 defining a plurality of fixing holes 310 therein, and a pivoting portion 32 extending from an end of the fixing arm 31. The pivoting portion 32 defines an oblong adjusting hole 320, through which the shaft post 12 of the shaft 10 freely extends. A first side of the pivoting portion 32, opposite to the fixing arm 31 defines a receiving slot 322 extending to communicate with the adjusting hole 320. A first resisting stub 324 and a second resisting stub 326 extend from the first side of the pivoting portion 32, situated at opposite ends of the adjusting hole 320. The first resisting stub 324 is situated adjacent to the receiving slot 324.

The washer 40 defines a double-D shaped fixing hole 42, through which the shaft post 12 of the shaft 10 non-rotatably passes.

The elastic assembly 50 includes a plurality of elastic rings (not labeled) arranged in a line and resisting against each other. Each elastic ring defines a round through hole 52, allowing the shaft post 12 of the shaft 10 to rotatably pass therethrough. The elastic assembly 50 provides elasticity along an axis of the shaft 10, to tighten the interfering member 60, and the rotating member 30.

The interfering member 60 is generally washer-shaped. A double D-shaped fixing hole 66 is defined in the interfering member 60, departing from a center of the interfering member 60. A first protrusion 62 and a second protrusion 64 radially extend from a circumference of the interfering member 60. The first and second protrusions 62 and 64 are located at opposite sides of the fixing hole 66, such that the circumference of the interfering member 60 is divided into two symmetrical curved guiding surfaces 65. A distance from the first protrusion 62 to a center of the fixing hole 66 is less than a distance from the second protrusion 64 to the center of the fixing hole 66. A first raised portion 67 and a second raised portion 68 located at opposite edges bounding the fixing hole 66, protrude from a first side of the interfering member 60 facing the rotating member 30. The first raised portion 67 neighbors the first protrusion 62. Opposite ends of the first and second raised portions 67 and 68 are smoothly connected to the first side of the interfering member 60.

Figure 3:
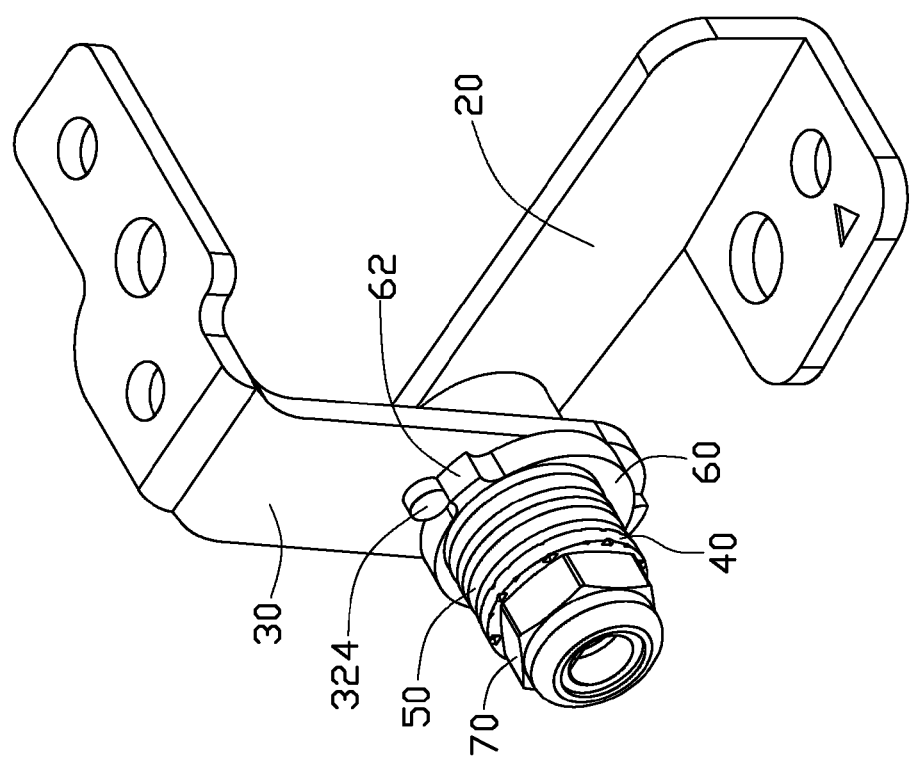
FIG. 3 is an assembled, isometric view of the hinge of FIG. 2.

Referring to FIG. 3, in assembly, the fixing portion 14 of the shaft 10 is fixed in the matching hole 26 of the fixing member 20, thereby, the shaft 10 is non-rotatably fixed to the fixing member 20. The shaft post 12 of the shaft 10 extends through the adjusting hole 320 of the rotating members 30, the fixing hole 66 of the interfering member 60, the through hole 52 of the elastic assembly 50, and the fixing hole 42 of the washer 40 in that order, with a distal end of the shaft post 12 engaging in the fastener 70 for preventing the washer 40, the elastic assembly 50, the interfering members 60, and the rotating member 30 from disengaging from the shaft 10.

Figure 4:
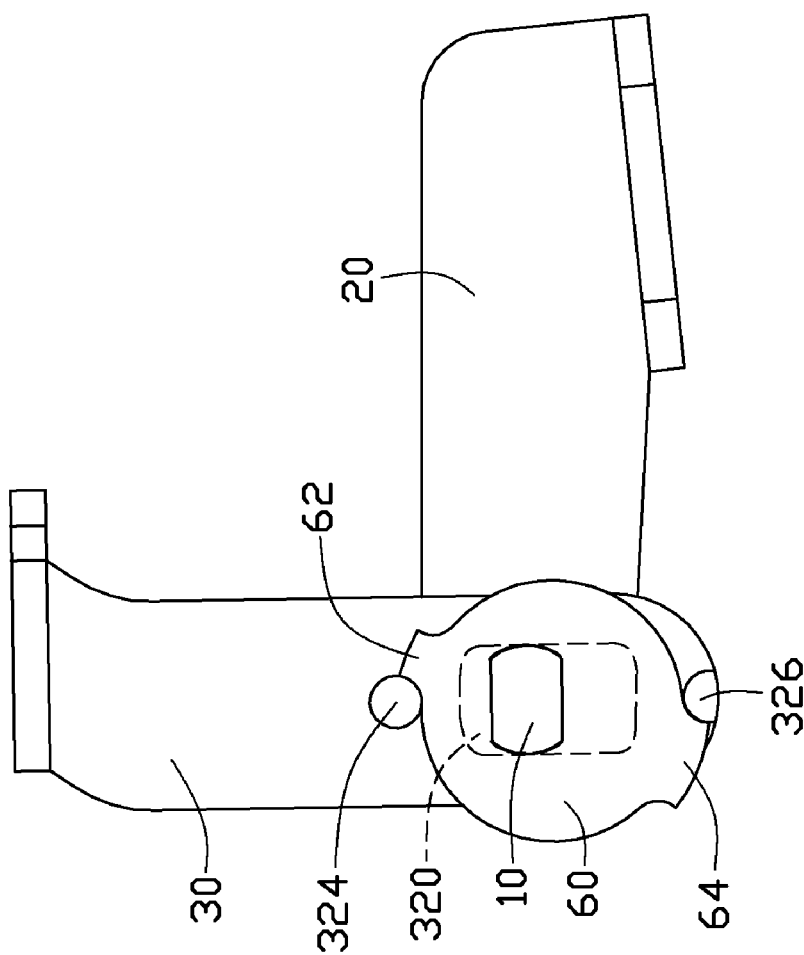
FIGS. 4 to 6 are schematic views of the hinge of FIG. 3, showing different operational states.

Referring to FIG. 4, in the aforementioned assembly, the first raised portion 67 of the interfering member 60 is received in the receiving slot 322 of the rotating member 30. The second raised portion 68 of the interfering member 60 is received in a lower portion of the adjusting hole 320 of the rotating member 30, and resists against the bottom flat surface of the shaft post 12 of the shaft 10 to position the rotating member 30. The first and second resisting stubs 324 and 326 abut against the guiding surfaces 65 of the interfering member 60, with the first and second protrusions 62 and 64 resisting against the first and second resisting stubs 324 and 326, correspondingly.

Figure 5:
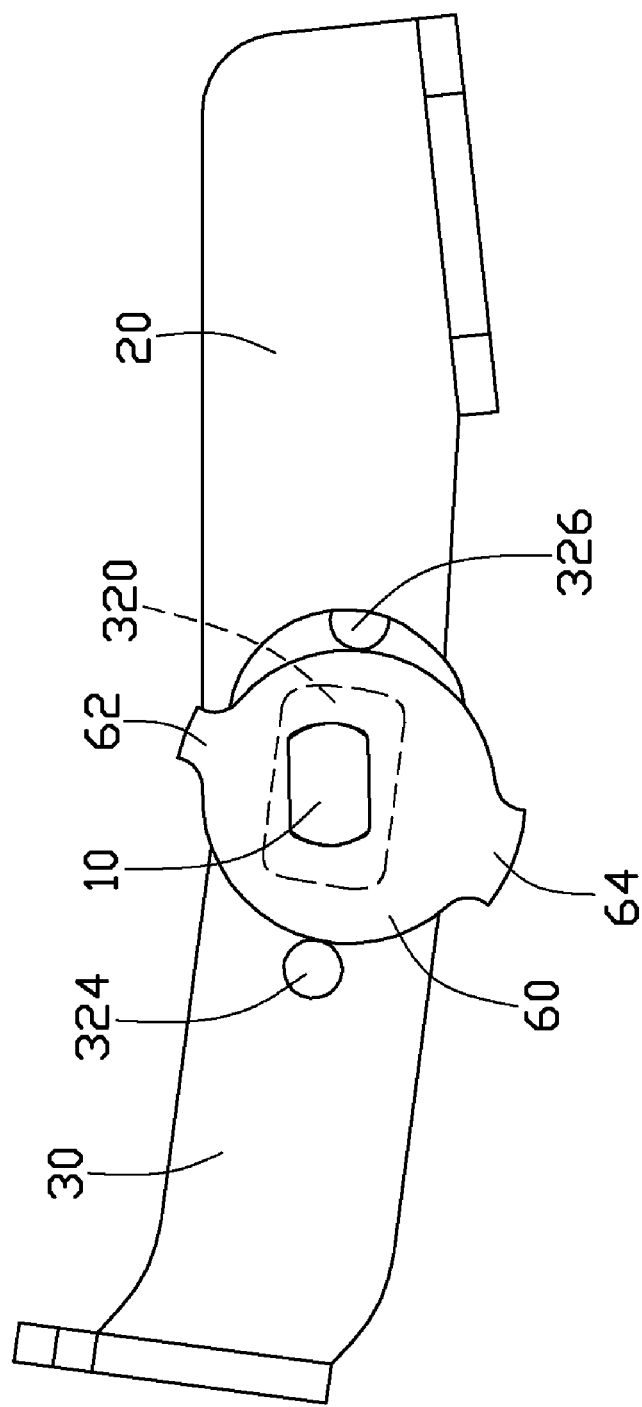
Figure 6:
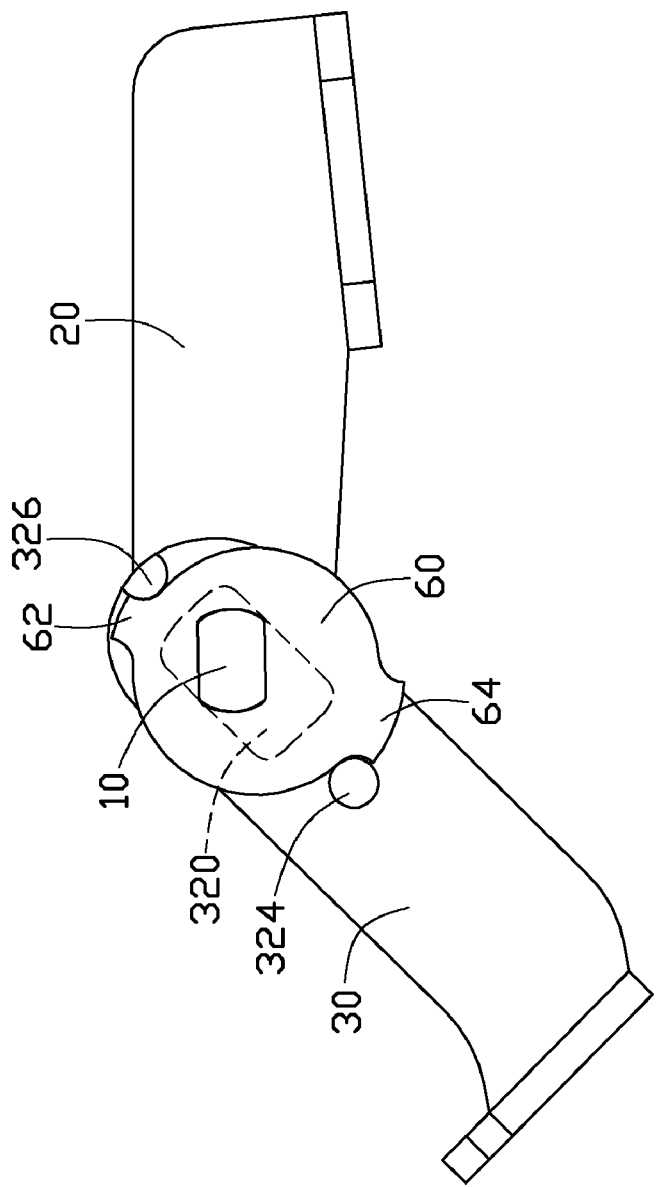

Referring to FIGS. 5, and 6, the above-mentioned hinge can be utilized in a collapsible device (not shown) including a cover (not shown) and a base (not shown), with the fixing member 20 fixed to the base via the fixing holes 220, and the rotating member 30 fixed to the cover via the fixing holes 310. In use, the rotating member 30 is rotated relative to the shaft 10, together with the cover. Therefore, the first raised portion 67 of the interfering member 60 moves out of the receiving slot 322 of the rotating member 30, and the second raised portion 68 of the interfering member 60 moves out of the adjusting hole 320. In this process, the first and second resisting stubs 324 and 326 of the rotating member 30 resist, and rotate along the corresponding guiding surfaces 65 of the interfering member 60. Thereby, the interfering member 60 is urged to relatively move along the adjusting hole 320 of the rotating member 30, so that the shaft post 12 of the shaft 10 relatively moves in the adjusting hole 320, away from the connecting portion 22 of the fixing member 20. Therefore, the cover moves away from the base, together with the rotating member 30, to prevent a proximal edge of the cover from hitting the base.

When the first resisting stub 324 resists against the second protrusion 64 of the interfering member 60, the second resisting stub 326 resists against the first protrusion 62 of the interfering member 60. At this time, the rotating member 30 cannot be rotated further.

It is believed that the present embodiment and its advantages will be understood from the foregoing description, and it will be apparent that various changes may be made thereto without departing from the spirit and scope of the description or sacrificing all of its material advantages, the example hereinbefore described merely being exemplary embodiment.

What is claimed is:

1. A hinge comprising:
   a fixing member;
   a shaft non-rotatably fixed to the fixing member, the shaft comprising a shaft post having a longitudinal axis;
   a rotating member defining an oblong adjusting hole, for the shaft post rotatably passing therethrough, a first resisting stub and a second resisting stub, opposite to the first resisting stub, each extending from a side of the rotating member;
   an interfering member defining a fixing hole off-center with respect thereto, the interfering member comprising two guiding surfaces; and
   a fastener fixedly mounted to a distal end of the shaft post, to prevent the rotating member and the interfering member from disengaging from the shaft post;
   wherein the shaft post is fixedly mounted to the fixing hole of the interfering member, with the first and second resisting stubs resisting against the corresponding guiding surfaces; and when the rotating member is rotated relative to the shaft post, the first and second resisting stubs always resist against and move along the corresponding guiding surfaces to urge the shaft post to relatively move in the adjusting hole in a direction generally transverse to the longitudinal axis of the shaft post.

2. The hinge of claim 1, wherein the interfering member is generally washer-shaped, a first protrusion neighboring the fixing hole of the interfering member, and a second protrusion opposite to the first protrusion, both radially extend from a circumference of the interfering member, and the guiding surfaces are symmetrical, and are formed between the first and second protrusions.

3. The hinge of claim 2, wherein the first and second resisting stubs are located neighboring opposite ends of the adjusting hole, and the first and second protrusions selectively resist against the first and second resisting stubs, correspondingly.

4. The hinge of claim 2, wherein a distance from the first protrusion to a center of the fixing hole is less than a distance from the second protrusion to the center of the fixing hole.

5. The hinge of claim 1, wherein the rotating member further defines a receiving slot neighboring the first resisting stub, and a first raised portion protrudes from the interfering member, to engage in the receiving slot.

6. The hinge of claim 5, wherein a second raised portion protrudes from the interfering member, to engage in a lower portion of the adjusting hole, and the first and second raised portions are located at opposite edges bounding the fixing hole of the interfering member.

7. The hinge of claim 6, wherein opposite ends of the first and second raised portions are smoothly connected to the interfering member.

8. The hinge of claim 6, wherein the interfering member is generally washer-shaped, a first protrusion and a second protrusion opposite to the first protrusion both radially extend from a circumference of the interfering member, and the guiding surfaces are symmetrical, and are formed between the first and second protrusions.

9. The hinge of claim 8, wherein a distance from the first protrusion to a center of the fixing hole is less than a distance from the second protrusion to the center of the fixing hole.

10. The hinge of claim 9, wherein the first and second protrusions selectively resist against the first and second resisting stubs, correspondingly.

11. The hinge of claim 1, further comprising an elastic assembly rotatably mounted to the shaft post, and abutting against the interfering member, wherein the elastic assembly provides elasticity along the longitudinal axis of the shaft post, to tighten the interfering member and the rotating member.

12. The hinge of claim 11, further comprising a washer fixedly mounted to the shaft post, wherein opposite sides of the washer resist against the fastener and the elastic assembly.

* * * * *